(12) United States Patent
Chitrapu (10) Patent No.: US 7,065,064 B2
(45) Date of Patent: *Jun. 20, 2006

(54) CELL SEARCH USING PEAK QUALITY FACTORS

(75) Inventor: Prabhaker R. Chitrapu, Blue Bell, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 985 days.

This patent is subject to a terminal disclaimer.

(21) Appl. No.: 10/028,463

(22) Filed: Dec. 20, 2001

(65) Prior Publication Data

US 2003/0117979 A1 Jun. 26, 2003

(51) Int. Cl.
*H04B 7/216* (2006.01)

(52) U.S. Cl. .................. 370/335; 370/350; 370/336; 370/342

(58) Field of Classification Search .............. 370/335, 370/350, 320, 342, 441, 479, 503, 509, 512, 370/514, 331, 210, 329, 330, 336, 208, 209, 370/332, 324; 375/145, 149
See application file for complete search history.

(56) References Cited

U.S. PATENT DOCUMENTS

| | | | |
|---|---|---|---|
| 4,701,934 A * | 10/1987 | Jasper | 375/147 |
| 4,785,463 A * | 11/1988 | Janc et al. | 375/147 |
| 5,353,332 A | 10/1994 | Raith et al. | |
| 5,930,366 A | 7/1999 | Jamal et al. | |
| 6,185,244 B1 * | 2/2001 | Nystrom et al. | 375/145 |
| 6,313,786 B1 * | 11/2001 | Sheynblat et al. | 342/357.02 |
| 6,385,264 B1 * | 5/2002 | Terasawa et al. | 375/371 |
| 6,480,558 B1 * | 11/2002 | Ottosson et al. | 375/350 |
| 6,504,830 B1 * | 1/2003 | Ostberg et al. | 370/342 |
| 6,526,091 B1 * | 2/2003 | Nystrom et al. | 375/142 |
| 6,760,361 B1 * | 7/2004 | Nystrom et al. | 375/145 |
| 6,768,768 B1 * | 7/2004 | Rao et al. | 375/142 |
| 6,894,995 B1 * | 5/2005 | Chitrapu et al. | 370/335 |
| 2003/0072356 A1 * | 4/2003 | Abraham et al. | 375/148 |

* cited by examiner

*Primary Examiner*—Wellington Chin
*Assistant Examiner*—Chuong Ho
(74) *Attorney, Agent, or Firm*—Volpe & Koenig, P.C.

(57) ABSTRACT

A code division multiple access communication system has a plurality of base stations. Each base station transmits a primary synchronization code (PSC) in a primary synchronization channel (PSCH). A user equipment monitors the PSCH and correlates the PSCH with the PSC. Using a result of the PSC correlation, PSCH locations are identified having a PSC peak. For each identified PSCH location, a quality factor comprising a shape factor associated with that location's PSC peak is determined. For each identified PSCH location, that identified PSCH location and the quality factor is stored. The PSCH locations and quality factors are accumulated over a number of frames and are processed using logic at algorithms to produce a reliable PSC detection.

32 Claims, 5 Drawing Sheets

---

74 — CORRELATE THE SSC CODES AT EACH PSC LOCATION

↓

75 — ACCUMULATE THE SSC CORRELATIONS OVER A NUMBER OF FRAMES UNTIL A CONFIDENCE LEVEL IS REACHED AT CERTAIN PSC PEAK LOCATIONS BASED ON ALLOWED SSC COMBINATIONS, RECEIVED SSC MAGNITUDE, SHAPE FACTOR, CONFIDENCE FACTOR AND INFORMATION FROM PREVIOUS SUCESSFUL SYNCHRONIZATION ATTEMPTS

↓

76 — DETERMINE THE SSCs OF THE CELL OR POTENTIAL CELLS TO SYNCHRONIZE WITH

CELL SEARCH USING PEAK QUALITY FACTORS

BACKGROUND

The invention generally relates to mobile wireless communication systems. In particular, the invention relates to cell search in such systems.

Figure 1:
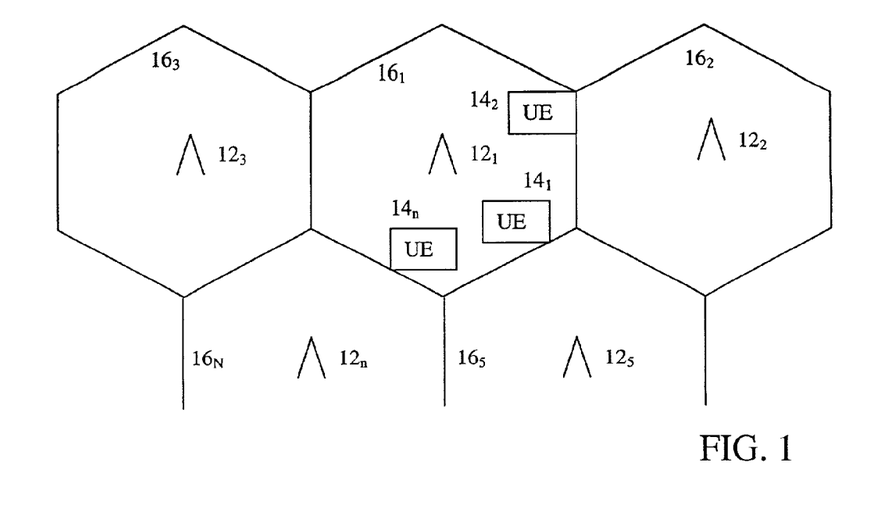
FIG. 1 is an illustration of a wireless communication system.

FIG. 1 illustrates a mobile wireless communication system. The communication system has a plurality of base stations $12_1$–$12_n$ (12). Each base station 12 communicates with user equipments (UEs) $14_1$–$14_n$ (14) within its operating area or cell $16_1$–$16_n$ (16). When a UE 14 is first activated, it is unaware of its location and with which base station 12 (or cell 14) to communicate. The process where the UE 14 determines the cell 14 to communicate with is referred to as "cell search."

Figure 2:
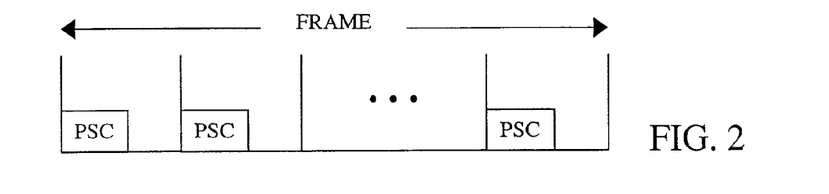
FIG. 2 is an illustration of a PSCH in a FDD/CDMA system.

In typical code division multiple access (CDMA) communication systems, a multi-step process is used for cell search. For step one, each base station 12 transmits the same primary synchronization code (PSC) in a primary synchronization channel (PSCH) 18. In a frequency division duplex (FDD) communication system using CDMA, the PSCH 18 is all the timeslots of a frame, such as fifteen (15) timeslots as shown in FIG. 2. Each base station's transmitted PSC is sent in all the timeslots.

Figure 3A:
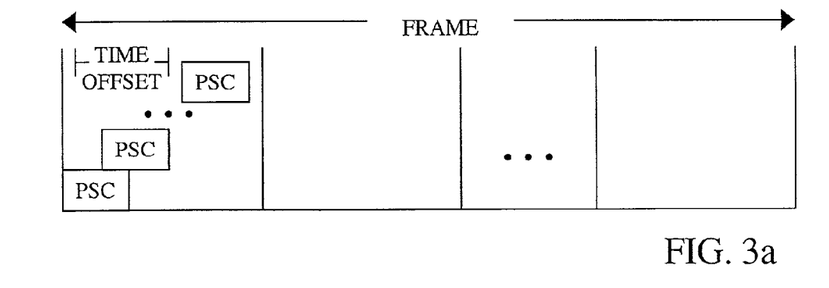
FIGS. 3a and 3b are illustrations of time offsets of PSCs in a TDD/CDMA system.
Figure 3B:
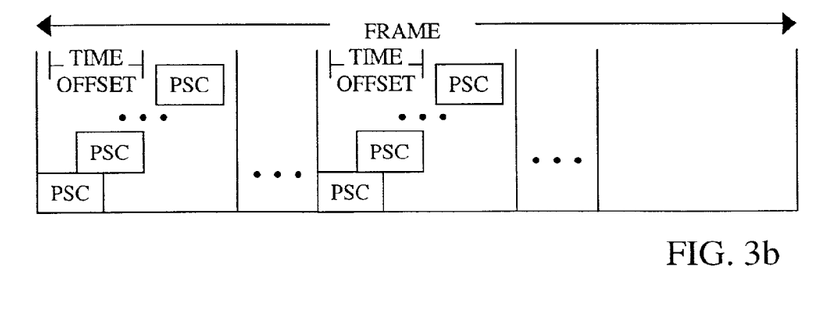

In a time division duplex (TDD) communication system using CDMA, the PSCH is one timeslot out of fifteen for type I cell search (as shown in FIG. 3a), such as slot 0 or in general K, where $0 \leq K \leq 14$, or two timeslots for type II cell search (as shown in FIG. 3b), such as slots 0 and 8 or in general K, where $0 \leq K \leq 6$, and K+8. Each base station transmits the same PSC in the PSCH timeslot(s). To reduce interference between secondary synchronization codes (SSCs) used in step two, each PSC is transmitted at a different time offset. The PSC offsets are at a set number of chips.

Figure 4:
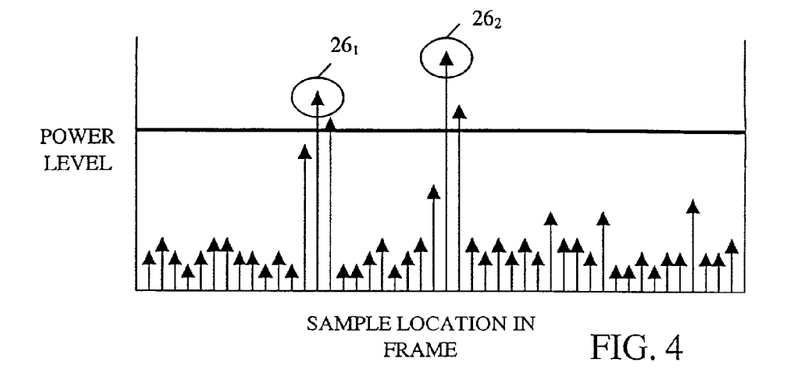
FIG. 4 is an illustration of peaks in a PSCH.

For both FDD/CDMA and TDD/CDMA, the UE 14 determines the base station 12 to synchronize to by searching the PSCH for received PSCs, such as using a matched filter. An example of the results of such a search in a TDD system is shown in FIG. 4. As shown in FIG. 4, peaks $26_1$–$2_{62}$ occur in the PSCH where there is a high correlation with the PSC code. Typically, the search results are accumulated over multiple frames to improve accuracy. Using the accumulated results, the PSC peak locations are determined in the PSCH.

Along with each base station's transmitted PSC, each base station 12 also simultaneously transmits secondary synchronization codes (SSCs) for both FDD and TDD type I and type II. The SSCs sent by each base station 14 are used to identify certain cell parameters, such as the code group and PSC time offset used by the cell. The UE 14 typically uses a correlator to detect the SSCs and the data modulated on them at each PSC peak identified in step I. In step III, the UE 14 completes the synchronization to one of the detected base stations 12 using the information gathered in steps I and II. In step III for FDD, typically, the UE 14 match filters the common pilot channel (CPICH) to identify the cell specific scrambling code to allow the UE 14 to read the broadcast control channel (BCCH). In TDD step III for both types I and II, typically, the UE 14 detects the cell specific midamble used in the broadcast channel and subsequently reads the broadcast channel.

This approach to cell search has drawbacks. One drawback is the memory required to store a frame's worth of input signal and PSC correlation values. Storing all these data points uses valuable memory resources. Another drawback is processing a frame's worth of data requires considerable processing time. Finally, storing only peak locations ignores other valuable information gathered during the correlation, such as the peak's shape.

Accordingly, it is desirable to have alternate approaches for cell search.

SUMMARY

A code division multiple access communication system has a plurality of base stations. Each base station transmits a primary synchronization code (PSC) in a primary synchronization channel (PSCH). A user equipment monitors the PSCH and correlates the PSCH with the PSC. Using a result of the PSC correlation, PSCH locations are identified having a PSC peak. For each identified PSCH location, a quality factor comprising a shape factor associated with that location's PSC peak is determined. For each identified PSCH location, that identified PSCH location and the quality factor is stored. The PSCH locations and quality factors are accumulated over a number of frames and are processed using logic at algorithms to produce a reliable PSC detection.

DETAILED DESCRIPTION OF THE PREFERRED EMBODIMENT(S)

Figure 5:
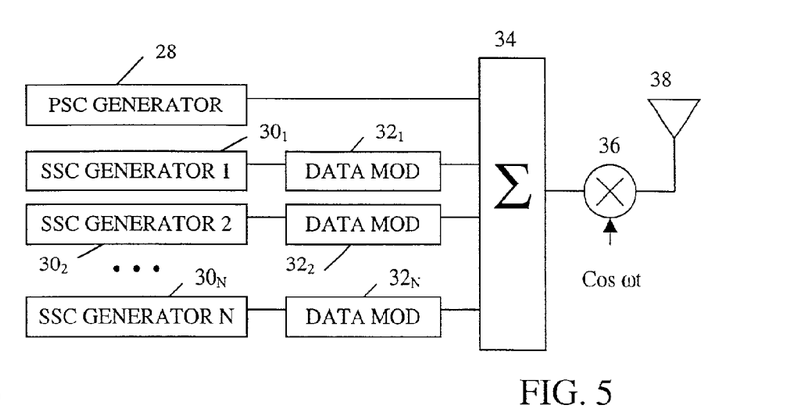
FIG. 5 is a simplified diagram of a base station for use in cell search using quality factors.
Figure 6:
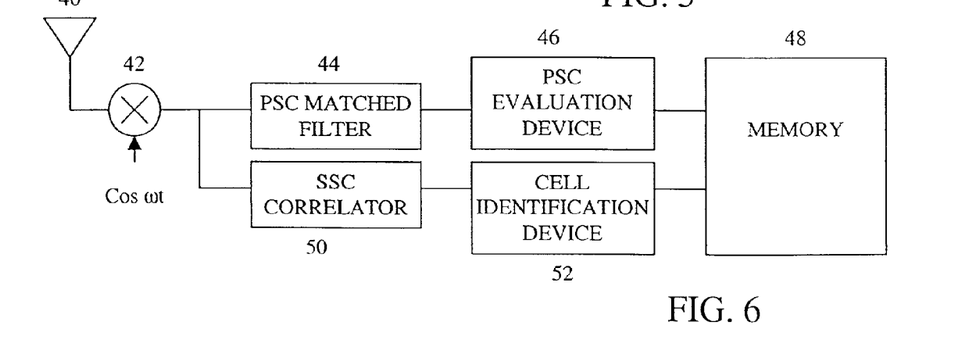
FIG. 6 is a simplified diagram of a UE for use in cell search using quality factors.

FIGS. 5 and 6 illustrate a base station 12 and a UE 14, respectively, for cell search using quality factors. Although cell search is explained in conjunction with a FDD/CDMA and a TDD/CDMA system, the same principles are applicable to other systems, such as other hybrid time division multiple access (TDMA)/CDMA communication systems. Additionally, these cell search procedures can be applied to other applications, where a periodic signal is being detected.

The base station 12 has a PSC generator 28 for producing the PSC, in the timeslots for a FDD/CDMA system or proper timeslot/time offset combination for a TDD/CDMA system for that base station 12. A plurality of SSC generators $30_1$–$30_n$, such as three SSC generators, and respective data modulators $32_1$–$32_n$ produce the SSCs modulated with data associated with that base station's cell information. These SSCs are time synchronized with the generated PSC. A combiner 34 combines the generated PSC and SSCs. The combined signal is modulated, such as by a mixer 36, and radiated by an antenna 38 or antenna array.

After propagation through the wireless radio channel, the combined signal as well as other base station's combined signals are received by the antenna 40 or antenna array of the UE 12, as shown in FIG. 6. The received signal is demodulated, such as by a mixer 42, to baseband. The resulting baseband signal is passed through a PSC matched filter 44, although other code correlation devices may be used. The PSC matched filter 44 is matched to the PSC code and produces an output as shown.

The PSC matched filter output is processed by a PSC Evaluation device 48. The operation of the PSC Evaluation device 48 is explained in conjunction with FIG. 7. Since, initially, the UE 12 has no timing information, it searches the whole frame for PSCs. The accumulated data over a frame is time divided into subframes, (56), such as into four (4) or eight (8) subframes. However, the cell search using quality factors can be performed without dividing a frame's data. For the following, if frame dividing is not performed, the entire frame's data can be treated as a single subframe.

Figure 7:
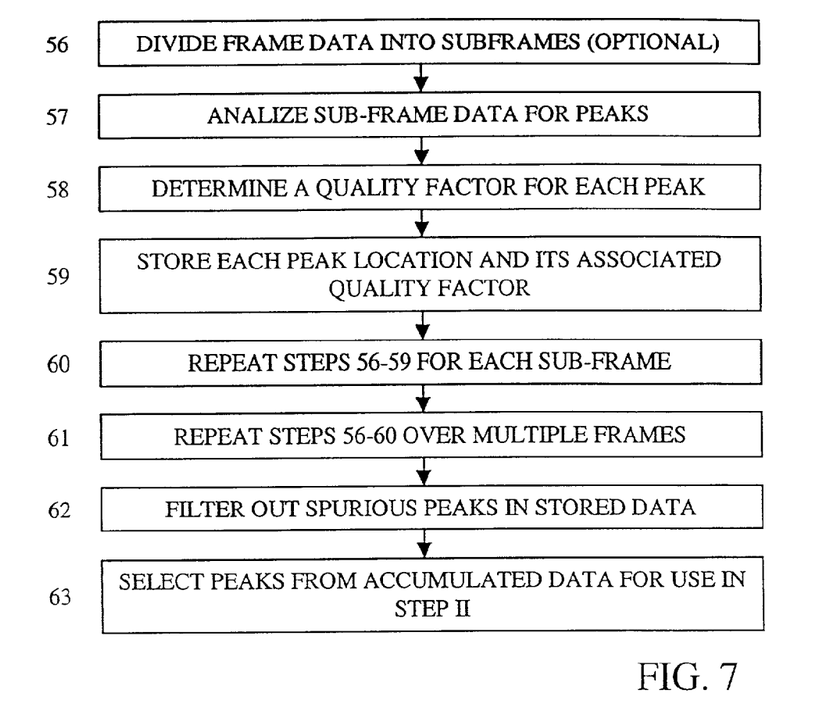
FIG. 7 is a flow chart for step I of cell search using quality factors.

The accumulated data for each subframe is analyzed for peaks, (57, 60). In one peak analysis approach, the data is evaluated so that a fixed number, such as four, of the correlation values with the highest magnitudes are selected as the peaks. The fixed number of selected peaks varies with the number of subframes selected. In another approach, a specified threshold is used so that correlation values exceeding the specified threshold, such two or three times the noise floor, are selected as peaks. One approach to determine the noise floor is to average the non-peak data point values.

Figure 9:
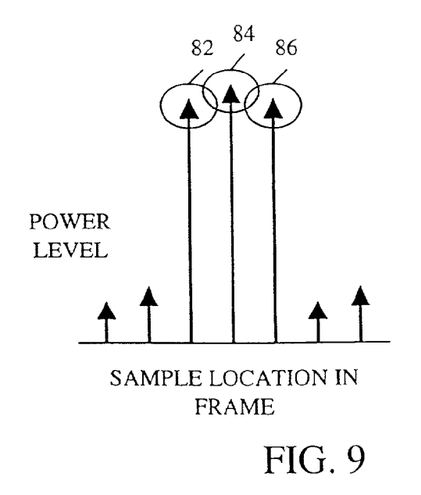
FIG. 9 is an illustration of a run of high PSC received power levels.

Additionally, a hybrid approach may be used. For the number of data points exceeding the threshold, the number of identified peaks is limited to a maximum specified number, such as four, having the highest magnitude. Conversely, if no data points exceed the threshold, a minimum specified number, such as two, having the highest magnitude are selected. For each determined peak, the chip location within the subframe is stored in the evaluation device's associated memory 48. For all these peak identification approaches, if a run of data points 82, 84, 86 have a high value, a local maxima 84 is selected as the peak and not all the data points 82, 84, 86 as illustrated in FIG. 9.

Along with the location of each peak, a peak quality factor is stored (58). One peak quality factor may contain a representation of the magnitude of the peak. One magnitude representation is a value relative to the noise floor, such as a multiple of the noise floor. Another magnitude representation is a raw amplitude of the peak's data point.

Figure 8:
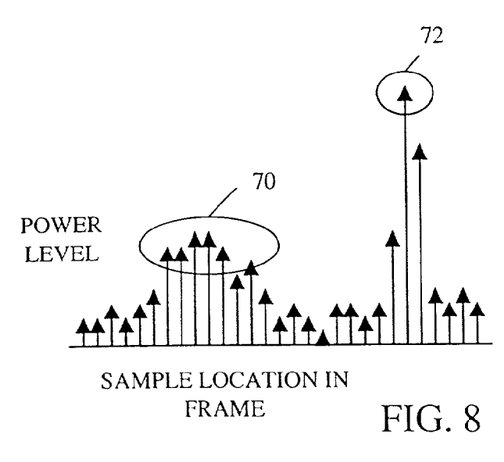
FIG. 8 is an illustration of a broad and steep peak.

Another peak quality factor may contain a shape factor. The shape factor represents a shape of the peak. Typically, as shown in FIG. 8, a broad peak 70 is more indicative of spurious noise than a sharp peak 72. One approach to quantize the shape is to measure the variance or standard deviation of data points neighboring the peak. A low variance or standard deviation is indicative of a broad peak 70. Another approach is to compare the arithmetic mean to the geometric mean of the surrounding data points. An arithmetic mean that is higher than the geometric mean indicates a steeper peak 72. One approach for this type of comparison is per Equation 1.

$$\text{Shape Factor} = \frac{\text{Arithmetic Mean}}{\text{Geometric Mean}} \quad \text{Equation 1}$$

A shape factor, using Equation 1, having a value greater than one (1) is indicative of a steeper peak.

Another quality factor may contain a confidence factor. The confidence factor represents the likelihood that this peak is associated with a nearby base station 12 and not a far away base station 12 or noise. One confidence factor is a relationship between the shape factor and the magnitude. A steep peak with a large magnitude is indicative of a nearby base station detection and a high confidence in the detection. A broad peak with a low magnitude results in low confidence in the detection. The confidence factor may also address the magnitudes and shape of one peak in relation to other peaks of that subframe, the entire frame or corresponding peaks at the same or nearby location in succeeding frames. To illustrate, if one peak has a much higher magnitude and steepness than other peaks, it is most likely a correct detection. One advantage of comparing each peak over the entire frame is that a peak with a high magnitude and steepness in one subframe may have a lower magnitude and steepness than a peak or multiple peaks in another subframe. As a result, a peak may have a high confidence factor with respect to other peaks in its subframe but may have a low confidence with respect to peaks in other subframes.

The confidence factor may also reflect information from previous cell search attempts. A UE 14 may typically be used in one or a couple of cells, such as within its home network. As a result, a detection of a peak at one of these cell's frame locations indicates it is a cell the UE 14 is expecting to see. The UE's PSC Evaluation device may use an algorithm or fuzzy logic to produce confidence factors reflecting data from previous successful cell search attempts.

After the frame data is evaluated, each peak's location and quality factors is stored, (59). The stored quality factor may represent any one or combination of the confidence factor, the magnitude factor and shape factor. By only storing the peak location and quality factors in each subframe, the memory required to store a frame's data is reduced. Accordingly, the efficiency in using the UE's memory 48 is increased.

Subsequent frames' data is similarly evaluated, (61). To simplify the subsequent frame evaluations, these evaluations may be limited to the locations of the previously detected peaks. If peaks disappear at a given location from frame to frame, they most likely result from spurious noise. Accordingly, these peaks are, preferably, filtered out and eliminated from further consideration in subsequent frames, (66). Filtering the spurious peaks results in a more accurate PSC detection process.

Spurious noise is a particular problem in TDD. Initially, the UE 14 has no timing reference. TDD UEs 14 transmit and receive uplink and downlink communications in the same frequency spectrum in different timeslots. As a result, a UE 14 performing cell search may mistake a neighboring UE's uplink communication as a PSC. However, it is unlikely that a neighboring UE's uplink communication would have a high code correlation from frame to frame. The filtering reduces the chance of such a false detection.

Subsequent frames' peaks data is also stored in the memory. Although a confidence factor for each peak per frame may be stored, the confidence factor may be a cumulative confidence factor. To illustrate, if a peak having a high confidence in one frame is repeatedly detected with a high magnitude and steepness in subsequent frames, its confidence factor increases. By contrast, if its magnitude is low and/or is broad, its confidence factor decreases. Using a cumulative confidence factor, the accumulation of subsequent frames data may end once a peak location exceeds a specified confidence threshold. The accumulation may even cease after the first frame, if one or a set of peaks has a confidence above the threshold and its or their confidence factor is much higher than any other peak's confidence factor, such as determined by using a ratio test.

The evaluation device 46 evaluates the stored data after each frame's processing to determine likely nearby base station's PSC peak(s), (63). The evaluation device 46 preferably uses a rule based decision process to evaluate the data. In one implementation, the evaluation device 46 accumulates in memory 48 the results of over a specified number of frames. Using the results from the specified number of frames, the evaluation device 48 selects likely nearby base station's PSC peak(s). Either a fixed number of peaks are selected or a number of PSC peaks exceeding an evaluation threshold is used. One such threshold evaluation is per Equation 2.

$$\sum_{i=1}^{n} W_1 M_i + W_2 S_i + W_3 C_i > T \quad \text{Equation 2}$$

n is the number of iterations. $W_1$, $W_2$ and $W_3$ are weighting factors. For data accumulated for a frame i, $M_i$ is the magnitude, $S_i$ is the shape factor; and $C_i$ is the confidence factor. T is the threshold value. If a specified number or a single PSC location is selected in step I, the location having the highest value in Equation 2 is selected.

Another equation for a system not using a confidence factor is Equation 3.

$$\sum_{i=1}^{n} W_1 M_i + W_2 S_i > T \quad \text{Equation 3}$$

In another implementation, the evaluation device 46 continues to accumulate frame data until either one PSC location or a specified number of locations exceed a threshold, such as using Equation 2, Equation 3 or the accumulated confidence factor. The evaluation device 46 may use other rule based approaches.

Since the approach to cell search may use a quality factor, a confidence factor, and previous successful cell search results, the determination of the cell synchronization process is improved. Furthermore, by using this additional information, a correct detection may be found faster, reducing the number of frames processed and overall processing complexity for cell search.

Figure 10:
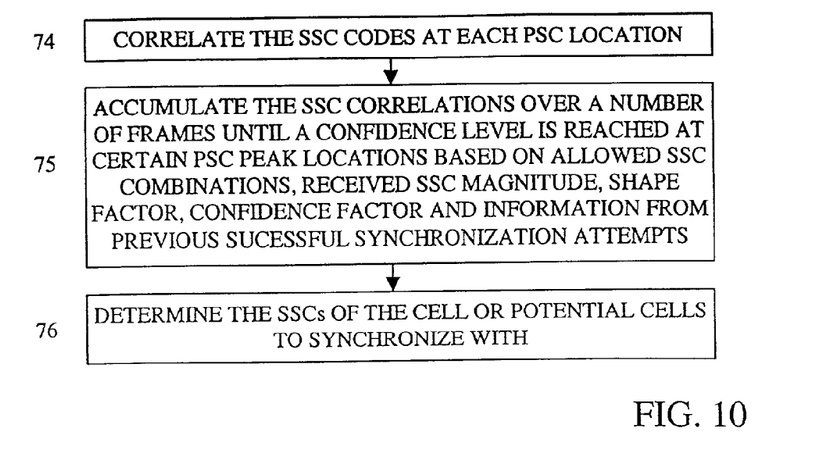
FIG. 10 is a flow chart of step II of cell search using quality factors.

Using the selected PSC peak locations, which is preferably a single location, from step I, the UE 14 performs step II. For each selected PSC location, a SSC correlator 50 correlates the received signal at that PSC location with each potential SSC, (74). A result of each SSC correlation is passed to a cell identity determination device 52 for each frame.

For each PSC location, a result of the SSC correlations are stored in a memory 48 associated with the cell identity determination device 52 on a frame by frame basis. Although the PSC evaluation device 46 and the cell identity determination device 52 are shown using a common memory 48, they could use separate memories. The stored value of each SSC correlation is a representation of a received power level of the correlated SSC. Preferably, the SSC correlations for each frame are stored using the quality factors, allowing more information to be passed to the cell identification device 52. The cell identity determination device 52 determines the most probable SSCs based on the stored information, preferably including quality factors and allowed SSC combinations.

The results of the SSC correlations for each frame are accumulated until a confidence level is determined using a rule based approach, (74). Factors considered in the confidence level determination are the received magnitude and shape factor of each SSC, the variation in each received SSCs magnitude and shape between frames and the allowed SSC combinations. Additionally, information from previous successful cell synchronizations may be included, (75). The previous information may contain the previously detected SSCs at a given frame location. If SSC codes are detected at a location associated with a prior successful synchronization, the confidence in the SSC detection is increased.

After a confidence level is reached for the detected SSCs, cell specific information is determined using the detected SSCs at each location and the data modulated on them, (76). This information is used in step III to complete the synchronization process.

In some systems, a UE 14 may not be permitted to operate in certain cells 16. These cells 16 may be "excluded" for a particular UE 14 or "not preferred." In such a system, after an initial frame is processed, detections of the "excluded" or "not preferred" cells are filtered out in the detection process. To illustrate, initially a UE 14 analyzes one frame's data for PSCs. One or multiple preliminary PSC locations are used for step II, while further frame's data is analyzed for step I to increase confidence in the detection. During a step II analysis of the preliminary location(s), one of the locations may belong to an "excluded" or "not preferred" cell. This location is subsequently filtered out during the continuing step I analysis.

Figure 11:
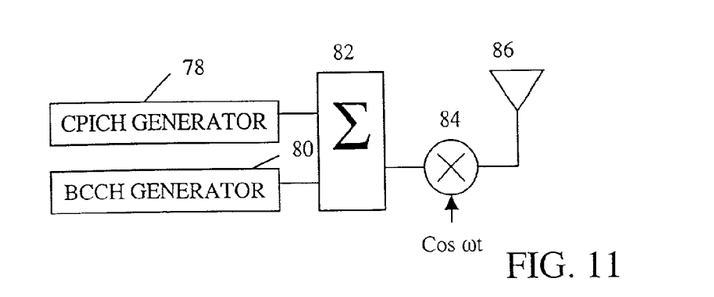
FIG. 11 is a simplified diagram of a base station for use in step III of FDD cell search.

FIGS. 11, 12, 13 and 14 are block diagrams of a simplified base station 12 and UE 14 for step III of cell search for FDD and TDD. For FDD, as shown in FIG. 11 for the base station 12, a CPICH signal is produced by a CPICH generator 78. Also, a BCCH signal carrying data is generated by a BCCH generator 80 using both the BCCH channelization code and the base station's scrambling code. The CPICH and BCCH signal are combined by a combiner 82 and modulated to radio frequency by a modulator 84. The radio frequency signal is radiated by an antenna 86 or antenna array of the base station 12.

Figure 12:
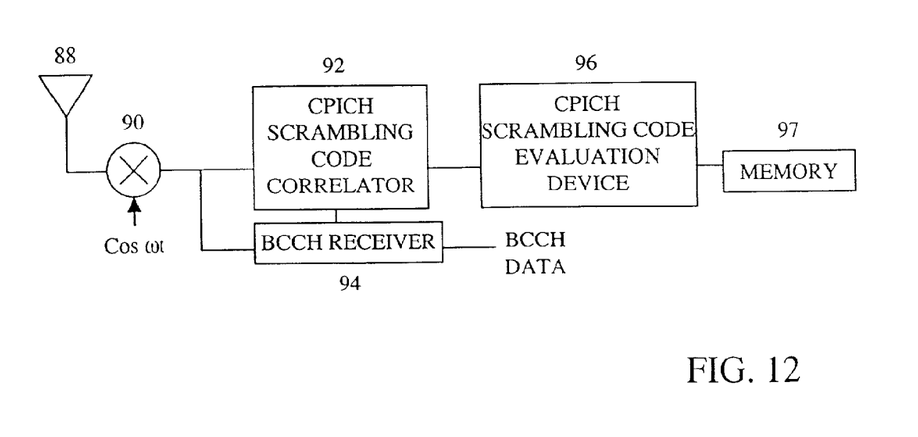
FIG. 12 is a simplified diagram of a UE for use in step III of FDD cell search using quality factors.

The radiated signal is received by the UE antenna 88, as shown in FIG. 12. The received signal is demodulated by a demodulator 90 to baseband. A CPICH scrambling code correlator 92 correlates the baseband signal with various candidate base station scrambling codes. A CPICH scrambling code evaluation device 96 stores a result of the scrambling code correlations in a memory 17. Preferably, the scrambling code correlations are stored using the quality factors, such as magnitude, shape and confidence factors.

After a confidence level in a scrambling code is determined, a BCCH receiver 94 uses the determined scrambling code to recover data set on the BCCH.

Figure 13:
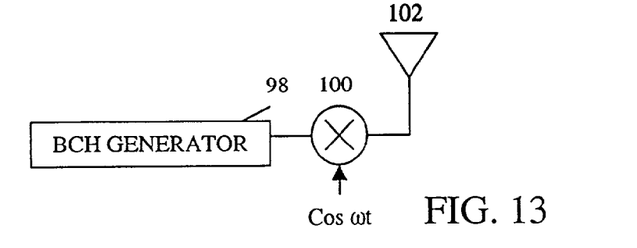
FIG. 13 is a simplified diagram of a base station for use in step III of TDD cell search.

For TDD, as shown in FIG. 13 for the base station 12, a BCH generator 98 produces a BCH communication burst time mutliplexed in the BCH timeslot and having a midamble associate with the BCH channelization code. The BCH burst is modulated to radio frequency by a modulator 100 and radiated by an antenna 102 or antenna array.

Figure 14:
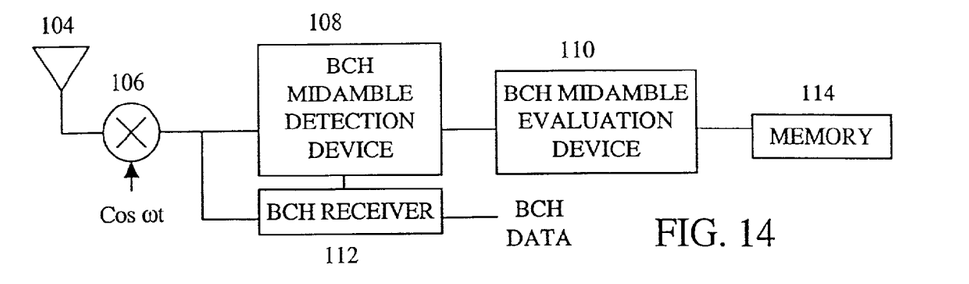
FIG. 14 is a simplified diagram of a UE for use in step III of TDD cell search using quality factors.

The radiated signal is received by the UE antenna 104, as shown in FIG. 14. The received signal is demodulated by a demodulator 106 producing a baseband signal. A BCH midamble detection device 108 correlates the baseband signal with all the potential midamble sequences. A BCH midamble evaluation device 110 stores a result of the midamble sequence correlations. Preferably, the midamble sequence correlations are stored using the quality factor. After a confidence level in the midamble sequence is determined, a BCH receiver 112 uses the determined midamble sequence and channelization code associated with that midamble sequence to recover the BCH data.

Figure 15:
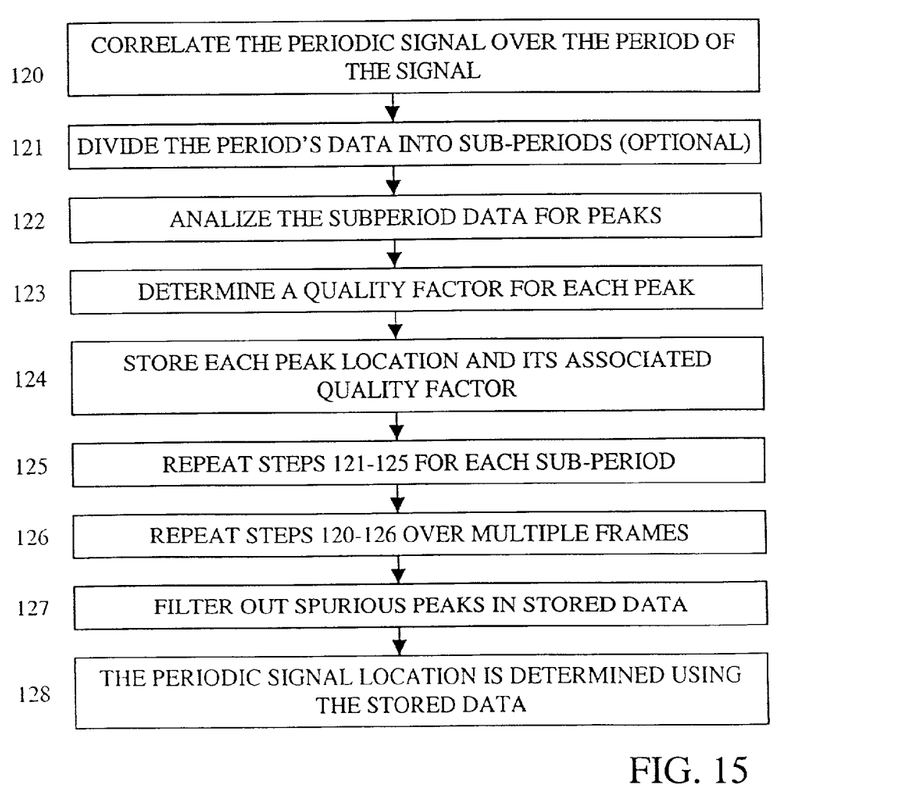
FIG. 15 is a flow chart of detecting a periodic signal using quality factors.

Although peak quality factors are discussed in the context of cell search, the same principals are applicable to correlation of any periodically repeating signal. The period length between repetitions of the signal are treated as a frame. FIG. 15 is a flow chart for correlating a periodic signal using quality factors.

The periodic signal has a particular period length between transmissions. A correlation with the signal is performed over the period length, (120). Although not required, preferably, the correlation period is divided into sub-periods, (121). The sub-period is analyzed for peaks, (122). A quality factor for each peak is determined, (123). For each peak, the peak location and quality factor is stored, (124). This process is repeated for each sub-period, (125), and then over multiple frames, (126). Spurious peaks are filtered out of the stored data, (127). Using the accumulated peak data, the periodic signal location is determined, (128).

What is claimed is:

1. A method for a user equipment to store information for cell search in a code division multiple access communication system, the system having a plurality of base stations, each base station transmitting a primary synchronization code (PSC) in a primary synchronization channel (PSCH), the method comprising:
   a user equipment monitors the PSCH and correlates the PSCH with the PSC;
   identifying PSCH locations having a PSC peak using a result of the PSC correlation;
   for each identified PSCH location, determining a quality factor comprising a shape factor associated with that location's PSC peak; and
   storing for each identified PSCH location, that identified PSCH location and the quality factor.

2. The method of claim 1 wherein the PSCH is divided into repeating frames and each identified PSCH location is a location within a frame time period corresponding to the time period of each frame.

3. The method of claim 1 wherein the frame time period is divided into subframes and the identified PSCH locations are stored with their associate subframes.

4. The method of claim 1 wherein the quality factor comprising a magnitude.

5. The method of claim 1 wherein the shape factor is based on in part a variance of a correlation of the peak location and correlations of neighboring locations.

6. The method of claim 1 wherein the shape factor is based on in part a standard deviation of a correlation of the peak location and correlations of neighboring locations.

7. The method of claim 1 wherein the shape factor is based on in part an arithmetic mean divided by a geometric mean of correlations of neighboring location with respect to the peak location.

8. The method of claim 1 wherein the quality factors are accumulated over a plurality of the frame time periods.

9. The method of claim 8 wherein peaks not present in multiple frames are filtered out of stored PSCH location information.

10. The method of claim 8 wherein the quality factors are accumulated over a fixed number of the frame time periods.

11. The method of claim 8 wherein the quality factors are accumulated until a confidence level in the accumulations are reached.

12. The method of claim 1 wherein each quality factor include a confidence factor representing a confidence in that peak being a true PSC location.

13. The method of claim 1 wherein the confidence factor is based on in part results from previous cell search attempts.

14. The method of claim 1 further comprising using the stored quality factors to determine a most likely PSC location for use in step II of cell search.

15. The method of claim 14 further comprising performing step II of cell search by storing a quality factor including a shape factor for each potential secondary synchronization code.

16. The method of claim 15 wherein the code division multiple access system uses frequency division duplex and the method further comprising performing step III of cell search by storing a quality factor including a shape factor for each potential scrambling code of a broadcast common control channel.

17. The method of claim 14 wherein the code division multiple access system uses time division duplex and the method further comprising performing step III of cell search by storing a quality factor including a shape factor for each potential midamble of a broadcast channel.

18. A user equipment (UE) performing cell search in a code division multiple access communication system, the system having a plurality of base stations, each base station transmitting a primary synchronization code (PSC) in a primary synchronization channel (PSCH), the UE comprising:
   a PSC matched filter for correlating the PSCH with the PSC;
   a PSC evaluation device for identifying PSCH locations having a PSC peak using a result of the PSC correlation, for each identified PSCH location, for determining a quality factor comprising a shape factor associated with that location's PSC peak; and
   a memory for storing for each identified PSCH location, that identified PSCH location and the quality factor.

19. The UE of claim 18 wherein the frame time period is divided into subframes and the identified PSCH locations are stored with their associate subframes.

20. The UE of claim 18 wherein the quality factor comprising a magnitude.

21. The UE of claim 18 wherein the shape factor is based on in part a variance of a correlation of the peak location and correlations of neighboring locations.

22. The UE of claim 18 wherein the shape factor is based on in part a standard deviation of a correlation of the peak location and correlations of neighboring locations.

23. The UE of claim 18 wherein the shape factor is based on in part an arithmetic mean divided by a geometric mean of correlations of neighboring location with respect to the peak location.

24. The UE of claim 18 wherein the quality factors are accumulated over a plurality of the frame time periods and peaks not present in multiple frames are filtered out of stored PSCH location information.

25. A user equipment (UE) performing cell search in a code division multiple access communication system, the system having a plurality of base stations, each base station transmitting a primary synchronization code (PSC) in a primary synchronization channel (PSCH), the UE comprising:
   means for correlating the PSCH with the PSC;
   means for identifying PSCH locations having a PSC peak using a result of the PSC correlation;
   means for each identified PSCH location, for determining a quality factor comprising a shape factor associated with that location PSCH peak; and
   means for storing for each identified PSCH location, that identified PSCH location and the quality factor.

26. The UE of claim 25 wherein the frame time period is divided into subframes and the identified PSCH locations are stored with their associate subframes.

27. The UE of claim 25 wherein the quality factor comprising a magnitude.

28. The UE of claim 25 wherein the shape factor is based on in part a variance of a correlation of the peak location and correlations of neighboring locations.

29. The UE of claim 25 wherein the shape factor is based on in part a standard deviation of a correlation of the peak location and correlations of neighboring locations.

30. The UE of claim 25 wherein the quality factors are accumulated over a plurality of the frame time periods and peaks not present in multiple frames are filtered out of stored PSCH location information.

31. The UE of claim 25 wherein the PSCH is received using an antenna.

32. The UE of claim 25 wherein the PSCH is received using an antenna array.

* * * * *

UNITED STATES PATENT AND TRADEMARK OFFICE
CERTIFICATE OF CORRECTION

| | |
|---|---|
| PATENT NO. | : 7,065,064 B2 |
| APPLICATION NO. | : 10/028463 |
| DATED | : June 20, 2006 |
| INVENTOR(S) | : Prabhakar R. Chitrapu |

It is certified that error appears in the above-identified patent and that said Letters Patent is hereby corrected as shown below:

ON THE TITLE PAGE

At section (75), Inventor: page 1, left column, line 1, delete "Prabhaker R. Chitrapu, Blue Bell, PA", and insert therefor --Prabhakar R. Chitrapu, Blue Bell, PA--.

IN THE SPECIFICATION

Proofread the Specification and there were the following errors:

At column 1, line 43, before the word "occur", delete "$\mathbf{26_1\text{-}2_{62}}$" and insert therefor --$\mathbf{26_1\text{-}26_2}$--.

At column 2, line 29, before "FDD/CDMA", delete "a" and insert therefor --an--.

At column 2, line 62, before "FDD/CDMA", delete "a" and insert therefor --an--.

At column 3, line 2, before "FDD/CDMA", delete "a" and insert therefor --an--.

UNITED STATES PATENT AND TRADEMARK OFFICE
CERTIFICATE OF CORRECTION

PATENT NO. : 7,065,064 B2
APPLICATION NO. : 10/028463
DATED : June 20, 2006
INVENTOR(S) : Prabhakar R. Chitrapu It is certified that error appears in the above-identified patent and that said Letters Patent is hereby corrected as shown below:

IN THE CLAIMS

At claim 7, column 8, line 6, after the word "neighboring", delete "location" and insert therefor --locations--.

At claim 11, column 8, line 17, before the word "reached", delete "are" and insert therefor --is--.

At claim 12, column 8, line 19, before the words "a confidence", delete "include" and insert therefor --includes--.

At claim 23, column 9, line 3, after the word "neighboring", delete "location" and insert therefor --locations--.

Signed and Sealed this

Nineteenth Day of December, 2006

JON W. DUDAS
*Director of the United States Patent and Trademark Office*